United States Patent [19]

Lidstone

[11] 3,987,862
[45] Oct. 26, 1976

[54] OFFSET AIR INTAKE HOOD

[75] Inventor: James E. Lidstone, St. Louis Park, Minn.

[73] Assignee: Donaldson Company, Inc., Minneapolis, Minn.

[22] Filed: Sept. 25, 1974

[21] Appl. No.: 509,042

[52] U.S. Cl. ............................... 180/54 A; 55/327; 55/385 B; 55/450
[51] Int. Cl.² ........................................ B60K 13/02
[58] Field of Search ............ 55/327, 337, 385, 396, 55/447, 448, 449, 450, 505, DIG. 28, 320; 180/69.01, 89 R, 89 A, 54 A; 285/22, 24, 424, 61, 62, 179; 123/122 R

[56] References Cited
UNITED STATES PATENTS

| 843,413 | 2/1907 | McKeen, Jr. ...................... 55/327 X |
| 1,651,186 | 11/1927 | Clark et al. ...................... 285/179 X |
| 1,828,816 | 10/1931 | Pierson ........................... 55/DIG. 28 |
| 1,983,866 | 12/1934 | Mikulasek ........................ 55/505 X |
| 2,233,183 | 10/1880 | Babcock .............................. 285/61 |
| 2,299,332 | 11/1942 | Marshall, Jr. ...................... 55/447 X |
| 3,151,695 | 10/1964 | Mintz ............................... 180/89 R |
| 3,224,174 | 12/1965 | Erbstoesser .................. 55/DIG. 28 X |
| 3,446,010 | 5/1969 | Hopkins ........................... 55/385 X |
| 3,520,561 | 7/1970 | Rininger ............................ 285/24 |
| 3,737,002 | 6/1973 | Yotsomoto ...................... 55/385 X |

FOREIGN PATENTS OR APPLICATIONS

| 129,633 | 10/1948 | Australia ............................. 55/396 |
| 412,865 | 2/1946 | Italy ................................. 55/327 |
| 539,188 | 9/1948 | United Kingdom .................. 55/337 |
| 184,082 | 8/1922 | United Kingdom ................. 285/179 |

Primary Examiner—Frank W. Lutter
Assistant Examiner—David L. Lacey
Attorney, Agent, or Firm—Merchant, Gould, Smith, Edell, Welter & Schmidt

[57] ABSTRACT

An improved intake hood for the air inlet pipe of the internal combustion engines of vehicles having a cab, the hood comprising a right angle conduit arranged to telescope over the inlet pipe so as to provide an annular chamber for trapping water. Internal clips are provided for supporting the hood on the inlet pipe, and the former is clamped at its bottom to the latter. The other end of the hood is cut off obliquely, so that the top overhangs the bottom, to minimize direct entry of falling rain and a screen is provided to keep out foreign bodies. This portion of the hood is to be directed horizontally for axial exposure to the air flow over the cab of the vehicle. The cross section of the hood is circular at the branch connected to the inlet pipe, and rectangular at the other branch, and the transistion piece therebetween is configured to maximize the separation of rain water from the air flowing through the hood.

6 Claims, 13 Drawing Figures

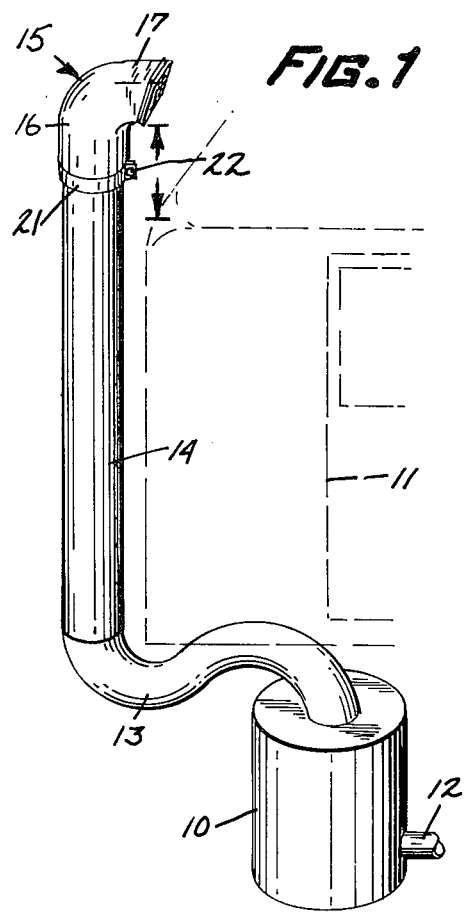
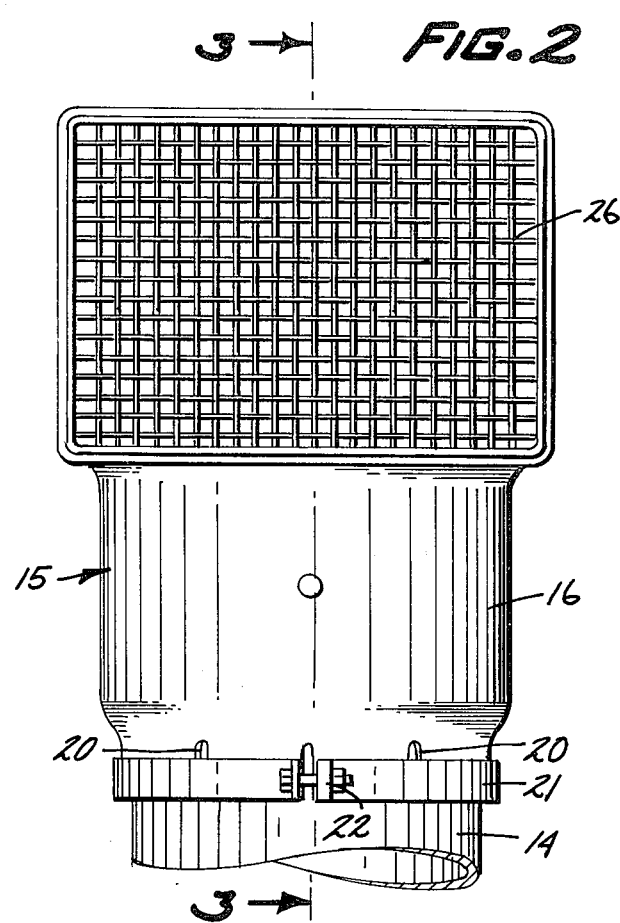
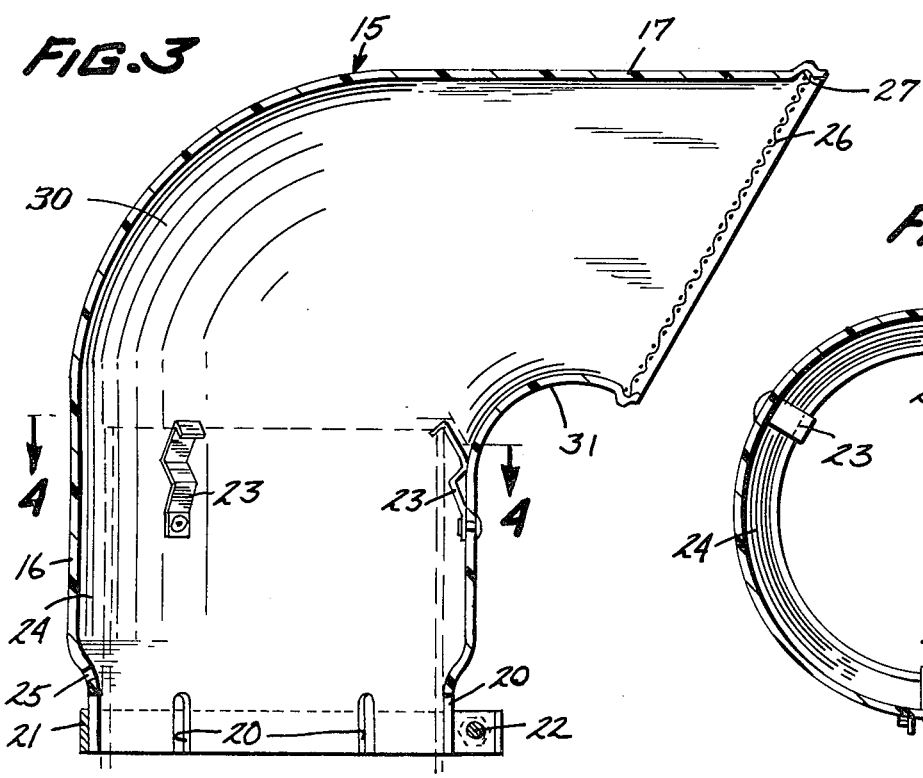
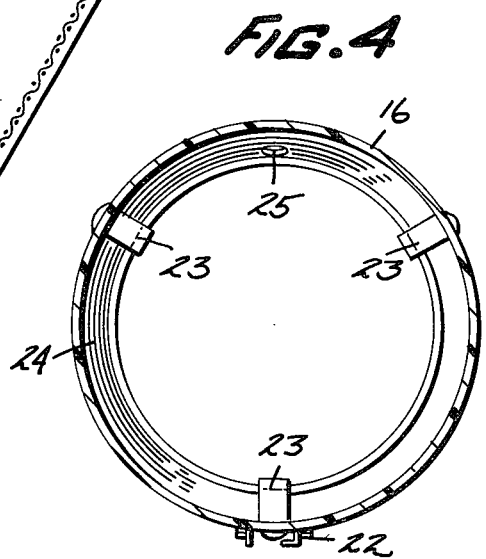

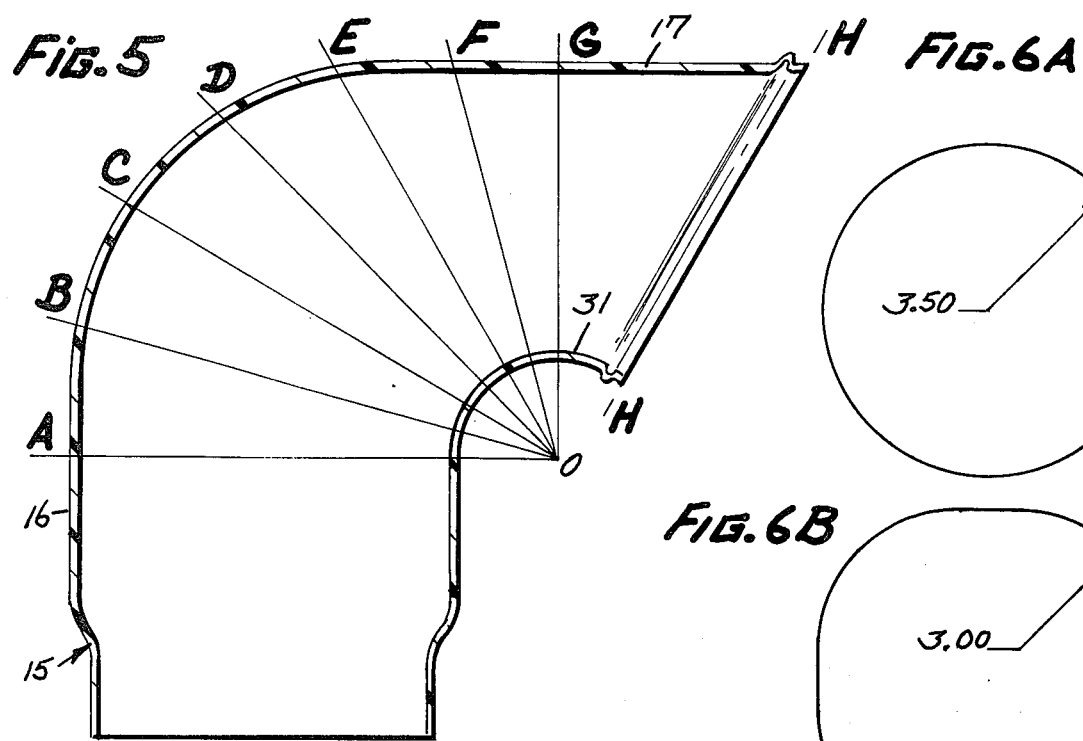
Fig. 5
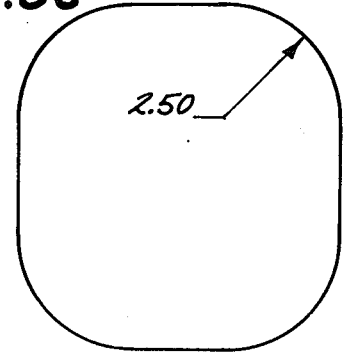
Fig. 6A
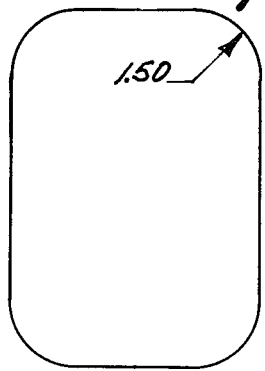
Fig. 6B
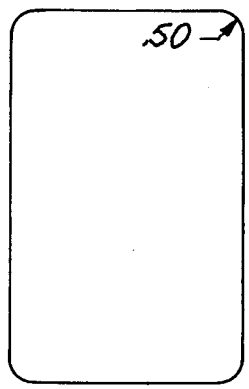
Fig. 6G
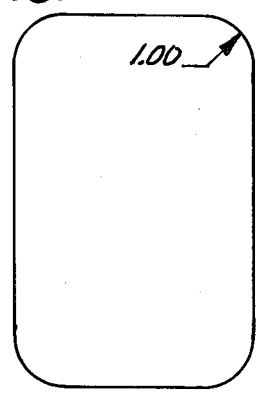
Fig. 6E
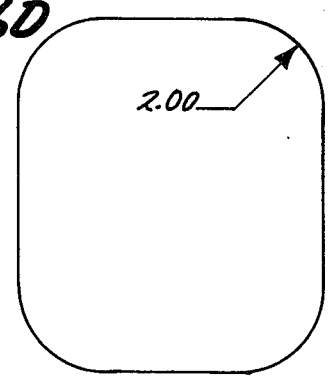
Fig. 6C
Fig. 6H
Fig. 6F
Fig. 6D

OFFSET AIR INTAKE HOOD

FIELD OF THE INVENTION

This invention relates to the field of large internal combustion engines for trucks and the like, and more particularly to air inlet systems for such engines. To protect these expensive engines from damage by ingestion of road dust, the air inlet system conventionally includes an air filter, to which the ambient air is supplied through an inlet pipe, usually in the form of a riser of large size extending vertically upward behind the cab. It is undesirable to have these risers simply open at the top, because in inclement weather considerable water in the form of rain or snow is taken in, to the detriment of the air filter. Caps or hoods of various sorts are accordingly provided for the ends of the inlet pipes, and this invention comprises an improved inlet hood of this sort.

A conventional structure now common in the trucking industry is that disclosed in my previous U.S. Pat. No. 3,791,112, issued on Feb. 12, 1974 to the assignee of the present invention. It is of a mushrooom-like configuration, the top surface being closed and the air being drawn upward through the annular under-surface. A surprisingly large amount of water is carried with the air, however, since the velocity of the air is not great enough to centrifugally deposit the water on the walls of the hood.

SUMMARY OF THE INVENTION

In this invention the hood is a right-angle conduit having a first branch directing forward over the cab of the vehicle, for exposure axially to the air flowing over the cab, and a second branch directed downwardly and so mounted on the end of the pipe as to define therewith an annular chamber. For esthetic reasons the first branch is rectangular in cross section, and its forward open end is screened and cut of at an angle to provide an overhang which reduces the direct entry of falling rain into the hood. The second branch is circular in section, to mate with the conventional inlet pipes, and the transistion piece between the two branches is configured, by variation in cross sectional area, to improve the separation of water from the air flowing through the hood. The separated water is swept down the rear wall of the hood into the annular chamber, and a weep hole is provided in the wall of the second branch to allow passage of the water of the chamber to the outside.

It is accordingly a principal object of the invention to provide a new and improved inlet hood for the air inlet pipes of internal combustion engines for vehicles.

Another object is to provide such a hood which is dimensioned and configured to be attractive in appearance without loss of utility.

Another object is to provide such a hood configured to reduce direct entry of falling rain into the air inlet pipe for the engine.

A further object is to provide such a hood in the form of a right-angle conduit, having one branch axially exposed to the air flow over the hood of a vehicle, and internally configured to improve the degree of separation of water from air passing therethrough.

Another object is to provide the new combination of a vehicle with such a hood.

Various other objects, advantages, and features of novelty which characterize my invention are pointed out with particularity in the claims annexed hereto and forming a part hereof. However, for a better understanding of the invention, its advantages, and object attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing

FIG. 1 is a fragmentary perspective view showing my hood in use on the air inlet system of a motor truck;

FIG. 2 is a front view of my hood mounted on an inlet pipe;

FIG. 3 is a sectional view of my hood taken along the line 3—3 of FIG. 2, with the inlet pipe shown in broken lines;

FIG. 4 is a transverse sectional view of my hood taken along the line 4—4 of FIG. 3;

FIG. 5 is an outline of the inner surface of my hood in axial section; and

FIGS. 6A to 6H are outline views showing the shapes of the transverse sections of one embodiment of my invention, taken along the lines AO to GO and HH of FIG. 5.

DESCRIPTION OF THE PREFERRED EMBODIMENT

As shown in FIG. 1 the air filter 10 of the internal combustion engine of a vehicle having a cab 11 is shown as mounted under the cab, to supply clean air to the engine through an outlet conduit 12. As is conventional air for filter 10 is supplied through a suitable flexible conduit 13 from a riser or inlet pipe 14. The hood 15 comprising my invention is shown to be mounted on the top of pipe 14, and to include a right angle conduit having a first branch 16 connected to pipe 14 and a second branch 17 directed forward over the top of cab 11. Hood 15 is preferably molded from a propylene material.

As shown in FIGS. 2 and 3, the first branch 16 of the hood is principally of greater diameter than pipe 14, but is reduced at its extremity to a diameter which slidingly engages the pipe. At this point the hood is provided with a plurality of slots 20, 20 to permit it to be further contracted against pipe 14 by a clamping band 21 secured by suitable fastening means 22. A plurality of clips 23 are secured internally to branch 16 as by rivets, so that the hood may be supported on the clips on the top end of pipe 14 until fastening means 22 is secured. It is evident that an annular chamber 24 is defined between the outer wall of pipe 14 and the inner wall of branch 16. A weep hole 25 provides passage for fluid from chamber 24.

Pipe 14 and branch 16 are of circular section. For esthetic reasons branch 17 is generally rectangular, and of greater width than height. The forward end of branch 17 is terminated at an oblique angle with respect to the horizontal axis of the hood, the angle being preferably about 60°, so that the top of the hood overhangs to minimize the direct entry of water in the form of falling rain. A screen closure 26 is adhesively secured in a groove 27 surrounding the opening to prevent the ingestion of solid bodies of appreciable size. This branch of the hood flares slightly from a transistion piece toward the opening, both downwardly and sidewardly.

Between the first, circular branch 16 and the second, rectangular branch 17 is transistion piece 30 which is designed to perform dual functions. First, it allows the use of a pleasing rectangular hood opening, to be efficiently connected with a circular inlet pipe, and second, it improves the separation of liquid water drops from the air flowing through it. These results are accomplished by a design in which the cross section of the passage through the hood is not everywhere the same, but varies not only in shape but also in total area, thus varying the speed of the flowing air from point to point along the hood axis. This is best shown, for one embodiment of my invention, in FIGS. 5 and 6. The dimensions shown in these figures and given in the following tabulation are illustrative only, and will differ for different sizes of inlet pipe 14.

It will be evident in FIG. 5 that the inner curve 31 of my right angle bend for this embodiment of the invention has a radius of 2.31 inches. Point O is the center of this curve, line AO is perpendicular to the axis of the tube and passes through the point of tangency of curve 31 with the straight wall of branch 16. The lines BO to GO, all passing through the point O, define successive angles of 15° at point O. The line HH does not pass through point O.

FIGS. 6A to 6H show the sections of the hood taken along the lines AO to GO and HH. In each case the vertical direction in the figures is perpendicular to the paper in FIG. 5. Each of these figures except FIG. 6A is a generally rectangular figure having its corners faired as circular guadrants. The X and Y dimensions of these figures, and their areas, are tabulated below.

| Section | X | Y | Area | Recip. |
|---|---|---|---|---|
| AO | 7.00 | 7.00 | 38.46 | .0261 |
| BO | 6.80 | 7.20 | 41.24 | .0242 |
| CO | 6.60 | 7.38 | 43.35 | .0231 |
| DO | 6.20 | 7.50 | 43.67 | .0228 |
| GO | 5.70 | 7.70 | 41.96 | .0246 |
| FO | 5.15 | 7.90 | 39.82 | .0241 |
| GO | 5.00 | 8.00 | 39.79 | .0244 |
| HH | 6.10 | 8.60 | 51.67 | .0193 |

Since the air velocity through the hood, neglecting friction, is inversely proportional to the area through which the flow occurs, it is evident that the air flows more slowly in the middle of the transistion piece than at either end. This change in velocity, combined with the rapid change in direction and the resulting centrifugal force, increases the effectiveness of the separation of liquid water drops from the air passing through the hood, over what would occur if the area were the same throughout the transistion piece.

For most satisfactory operation, my hood 15 should be at least 14 inches above the top of the vehicle cab, so that water carried in the air stream flowing over the cab due to its movement along the highway is not projected into the hood by the "roof bounce" air flow, but passes beneath it.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principal of the invention, to the full extent indicated by the broad general meaning of the terms in which the appended claims are expressed.

I claim as my invention:

1. In combination with a motor vehicle having a cab and an internal combustion engine:
   a. an air inlet pipe extending vertically behind the cab, said inlet pipe having an outlet end positioned generally above and behind the cab;
   b. an intake hood for said inlet pipe comprising a right angle conduit having a first branch directed forward above said cab, for exposure axially to air flow over said cab, and a second branch having a downwardly directed extremity which is connected to said inlet pipe so as to define therewith an annular chamber generally surrounding the outlet end of said inlet pipe, including means within said second branch and spaced from said extremity for supporting said right angle conduit on said end of said inlet pipe, and further including means for clamping said extremity of said second branch to said inlet pipe; and
   c. means for draining water from said annular chamber.

2. Apparatus according to claim 1 wherein said means for draining water from said annular chamber include a liquid drain opening extending through said downwardly directed extremity of said second branch to enable the passage of liquid from said annular chamber.

3. The apparatus of claim 2 wherein the cross-section of said first branch is generally rectangular and the cross-section of said second branch is generally circular, and in which said first and second branches are joined by a transition piece.

4. In combination with a motor vehicle having a cab and an internal combustion engine:
   a. an air inlet pipe extending upwardly from the motor vehicle engine, said inlet pipe having an outlet end positioned generally adjacent the cab;
   b. an intake hood for said inlet pipe comprising a right angle conduit having a first branch directed generally forward toward the front of the cab for exposure axially to air flow around the cab, and a second branch having a downwardly directed extremity which is connected to said inlet pipe so as to define therewith an annular chamber generally surrounding the outlet end of said inlet pipe, including means within said second branch and spaced from said extremity for supporting said right angle conduit on said inlet pipe outlet end;
   c. means for connecting said extremity of said second branch to said inlet pipe; and
   d. means for draining water from said annular chamber.

5. Apparatus according to claim 4 wherein said means for draining water from said annular chamber include a liquid drain opening extending through said downwardly directed extremity of said second branch to enable the passage of liquid from said annular chamber.

6. The apparatus of claim 5 wherein the cross-section of said first branch is generally rectangular and the cross-section of said second branch is generally circular, and in which said first and second branches are joined by a transition piece.

* * * * *